Figure 1:
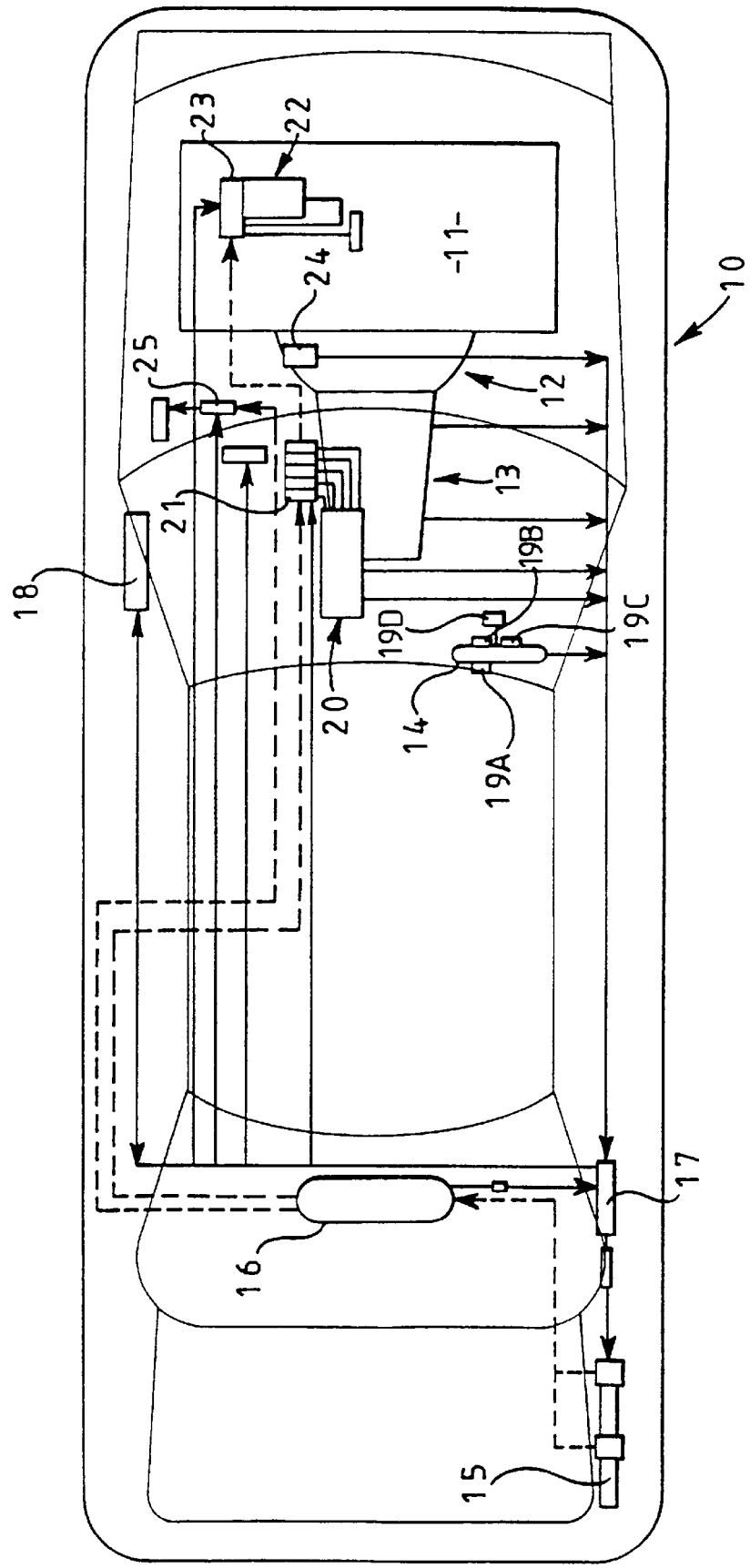

United States Patent [19]
Muddell et al.

[11] Patent Number: 6,102,829
[45] Date of Patent: Aug. 15, 2000

[54] GEAR CHANGE MECHANISM

[75] Inventors: Giles D. Muddell; Roland J. Broadbent, both of Oxon, United Kingdom

[73] Assignee: Prodrive Holdings Limited, United Kingdom

[21] Appl. No.: 09/077,162

[22] PCT Filed: Nov. 21, 1996

[86] PCT No.: PCT/GB96/02875

§ 371 Date: May 22, 1998

§ 102(e) Date: May 22, 1998

[87] PCT Pub. No.: WO97/20155

PCT Pub. Date: Jun. 5, 1997

[30] Foreign Application Priority Data

Nov. 24, 1995 [GB] United Kingdom .................... 9524073

[51] Int. Cl.[7] ............................ B60K 41/28; B60K 41/22
[52] U.S. Cl. ............................. 477/77; 74/335; 192/3.58; 192/52.4
[58] Field of Search .................. 192/52.4, 3.58, 192/3.61, 3.62, 3.63; 477/78, 77; 74/335

[56] References Cited

U.S. PATENT DOCUMENTS

| | | |
|---|---|---|
| 4,262,784 | 4/1981 | Sibeud . |
| 4,603,596 | 8/1986 | Akashi et al. . |
| 4,998,443 | 3/1991 | Janiszewski . |
| 5,095,434 | 3/1992 | Lupo et al. . |
| 5,191,804 | 3/1993 | Genise ..................................... 74/335 |
| 5,697,251 | 12/1997 | Lorriette et al. ........................ 74/335 |
| 5,722,297 | 3/1998 | Tischer et al. ....................... 74/335 X |

FOREIGN PATENT DOCUMENTS

| | | |
|---|---|---|
| 0 378 218 | 7/1990 | European Pat. Off. . |
| 2 233 893 | 6/1973 | France . |
| 2 119 459 | 11/1983 | United Kingdom . |
| WO89/04432 | 5/1989 | WIPO . |
| WO95/02775 | 1/1995 | WIPO . |

OTHER PUBLICATIONS

Patent Abstracts of Japan vol. 9 No. 311 publication No. JP60146953 Feb. 8, 1985 Gear Shift Control for Automatic Car Speed Changer.

*Primary Examiner*—Rodney H. Bonck
*Attorney, Agent, or Firm*—Nixon & Vanderhye

[57] ABSTRACT

A vehicle gear change mechanism is provided to enable a gear change to be effected with a conventional gearbox without manually moving the gears. The gear changes are effected by an actuator which is hydraulically powered and is controlled by a control device including a control unit. The actuator is operated such that the force applied to effect a gear change is varied to be reducible during gear engagement. In one arrangement this is achieved by controlling the supply of hydraulic fluid through a valve and a hydraulic accumulator. There is also provided a device for controlling operation of a clutch to the gearbox whereby smooth gear changes are effected.

13 Claims, 7 Drawing Sheets

A   Actual clutch position
D   Desired clutch position

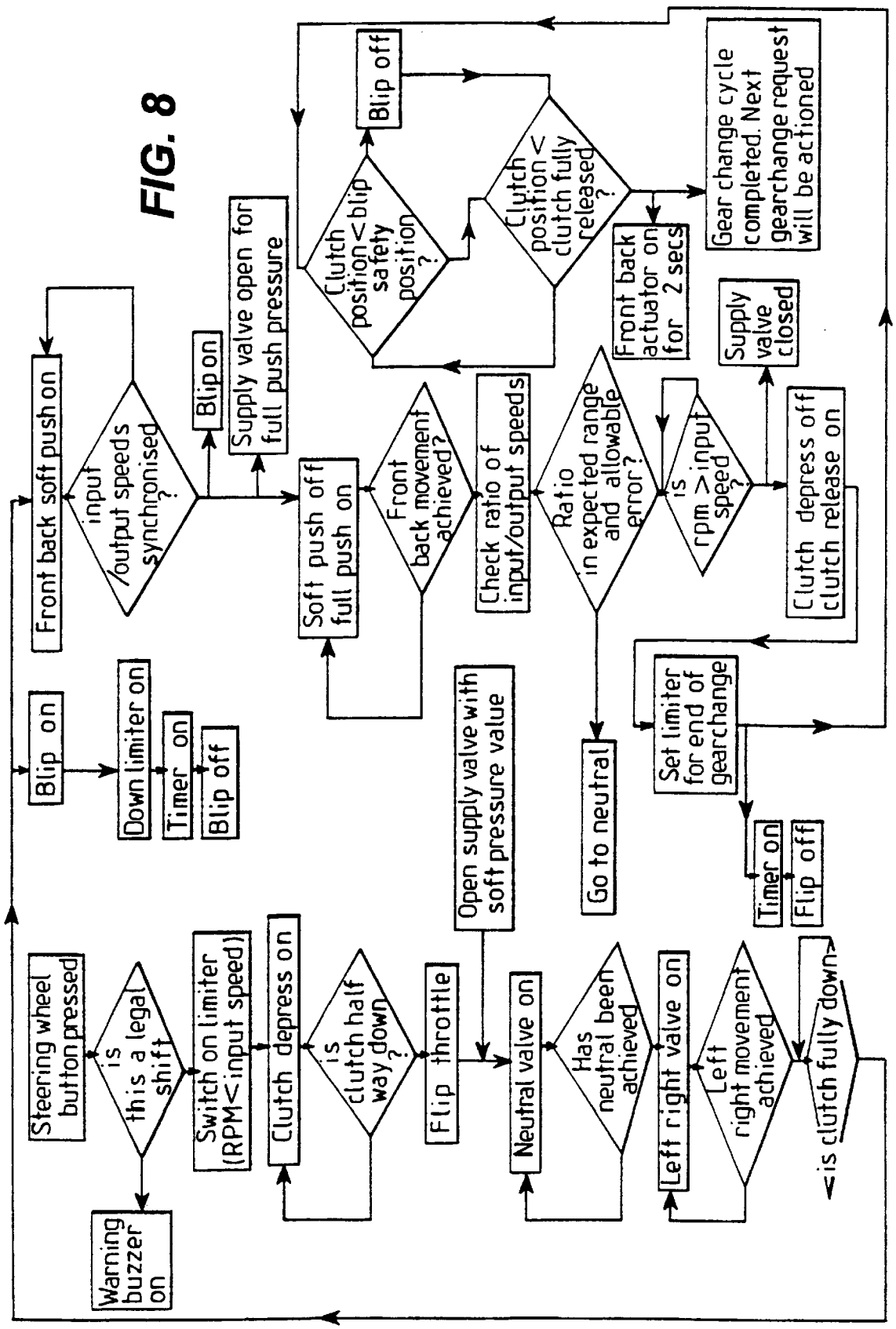

6,102,829

GEAR CHANGE MECHANISM

This invention relates to gear change mechanisms and associated equipment used in automobiles.

In our prior patent application WO 95/02775 we have described a gear change mechanism and associated clutch and throttle mechanisms whereby gear changes may be effected automatically upon the driver initiating a gear change operation.

The present invention is concerned with providing an improved and modified gear change mechanism and associated mechanisms. However the mechanisms to be described may find application independently of the arrangement described in said earlier application.

In one aspect the invention provides a vehicle gear change mechanism comprising a prime mover, a change speed gearbox, clutch means through which drive is transmitted from the prime mover to the gearbox, a gearbox actuator for effecting a change of gear ratio to the gearbox, the actuator being power operated, and control means for controlling the operation of the actuator in accordance with a selected change of gear ratio, the control means controlling the operation of the actuator such that the force supplied by the actuator to effect a gear change is varied so that over part of the movement of the actuator during which gear engagement takes place, the force is less than during another part of the movement of the actuator.

By this means the gear engagement may be achieved more smoothly and with less likelihood that the gearbox will become damaged, that jerky gear changes will be made, and that the gear engagement will be unduly forced. In particular the force applied during engagement of a gear is reducible over that part of the gear change in which the synchromesh is being engaged. The arrangement is intended to assist in enabling better equality of gear speeds to be achieved during engagement.

Preferably the actuator is hydraulically operated and the control means controls the operation of the operator according to the hydraulic pressure applied to the actuator whereby the hydraulic pressure applied to the actuator, and hence to operate a gear change, is reduced during gear engagement, the position of the actuator being monitored by the control means.

Conveniently the supply of hydraulic pressure fluid to the actuator is interrupted during gear engagement.

In one arrangement supply means for supplying hydraulic fluid to the actuator includes a control valve and a hydraulic accumulator or other compliant or yieldable means located downstream of the control valve, and a pressure sensor downstream of the control valve, whereby on interrupting the hydraulic supply by operation of the control valve a reduced pressure is available from the hydraulic accumulator, the valve being opened and closed with reference to the pressure sensed by the pressure sensor, the position of the actuator, and in accordance with the control means.

It will be appreciated that downstream of the valve the fluid pressure will decay, when the valve is not open, due to leakage past seals etc., or when movement of the actuator takes place, thereby giving rise to the reduced pressure.

Alternatively, the means for supplying hydraulic fluid to the actuator includes a pressure regulator to selectively reduce the hydraulic pressure downstream of the regulator which is applied to the actuator.

In another aspect of the invention the clutch means is hydraulically operated and the control means effects operation of the clutch means during a gear change selection, the clutch means being hydraulically powered towards a clutch disengaged position and biased towards an engaged position, movement towards an engaged position being controlled by the control means through a pressure release valve.

An object of this arrangement is to be able to eliminate the need for manual operation of the clutch whereby automatic gear changes can be effected using an automatic clutch.

The key to successful clutch engagement is to replicate a smooth manually operated clutch release and, according to the invention, this is achieved by control means controlling operation of a pressure release valve according to the position of the clutch. Preferably the release valve is controlled according to pre-programmed control means whereby the valve is opened and closed successively thereby allowing clutch release to take place in a gradual manner. The control may be controlled according to a timing sequence and/or having regard to the relative speeds of the engine and the road wheels.

Figure 2:
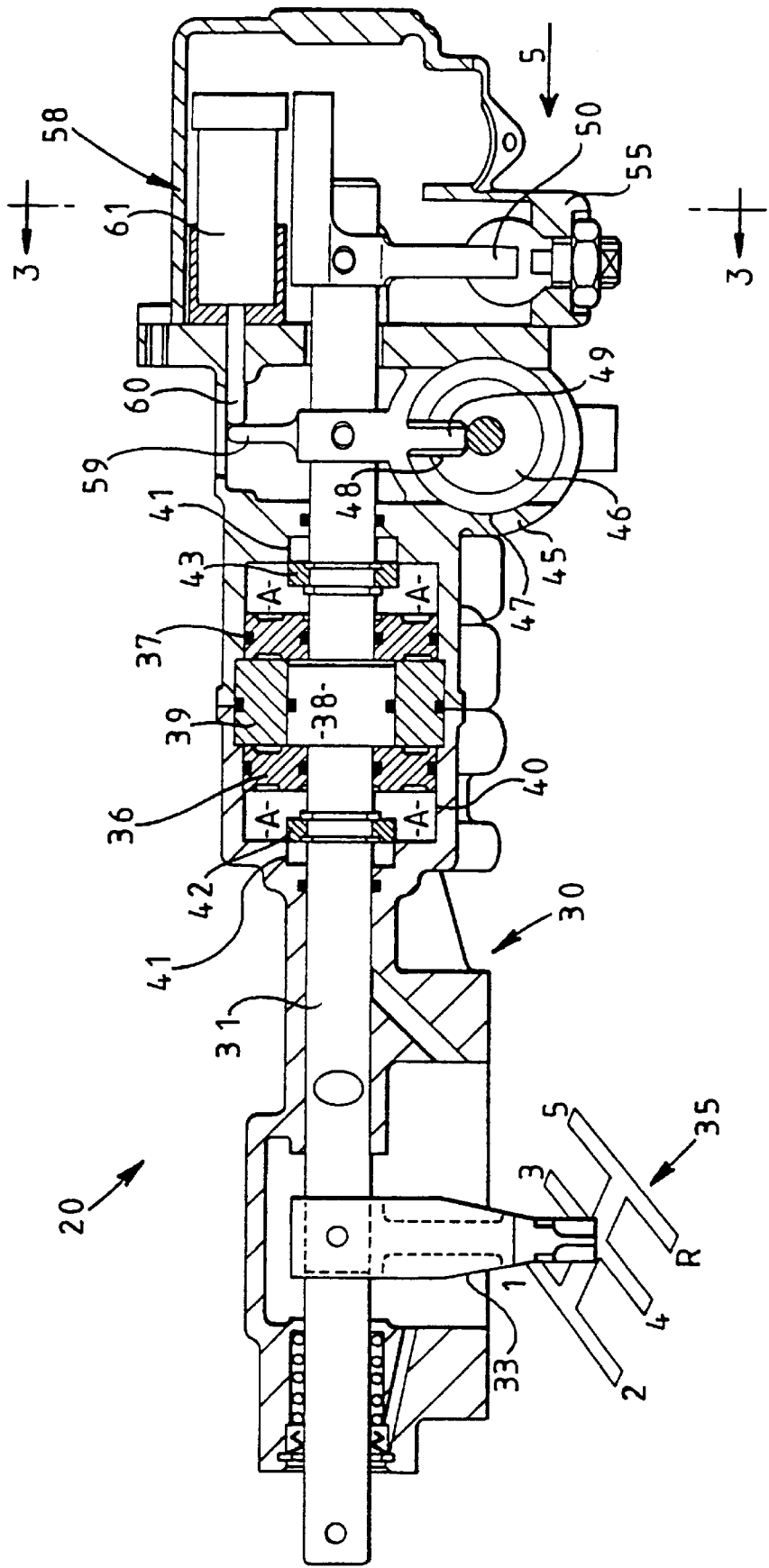
Figure 3:
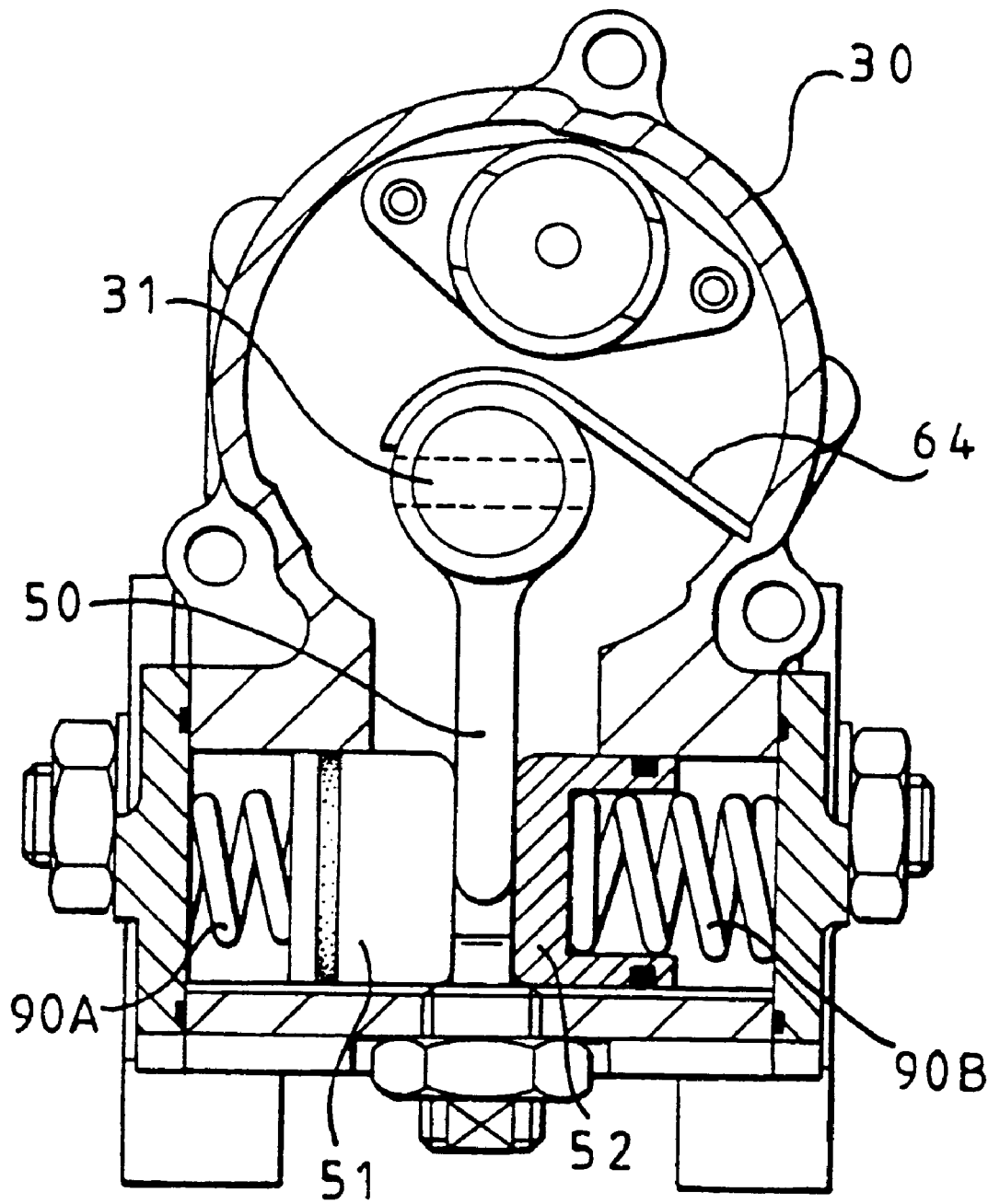
Figure 4:
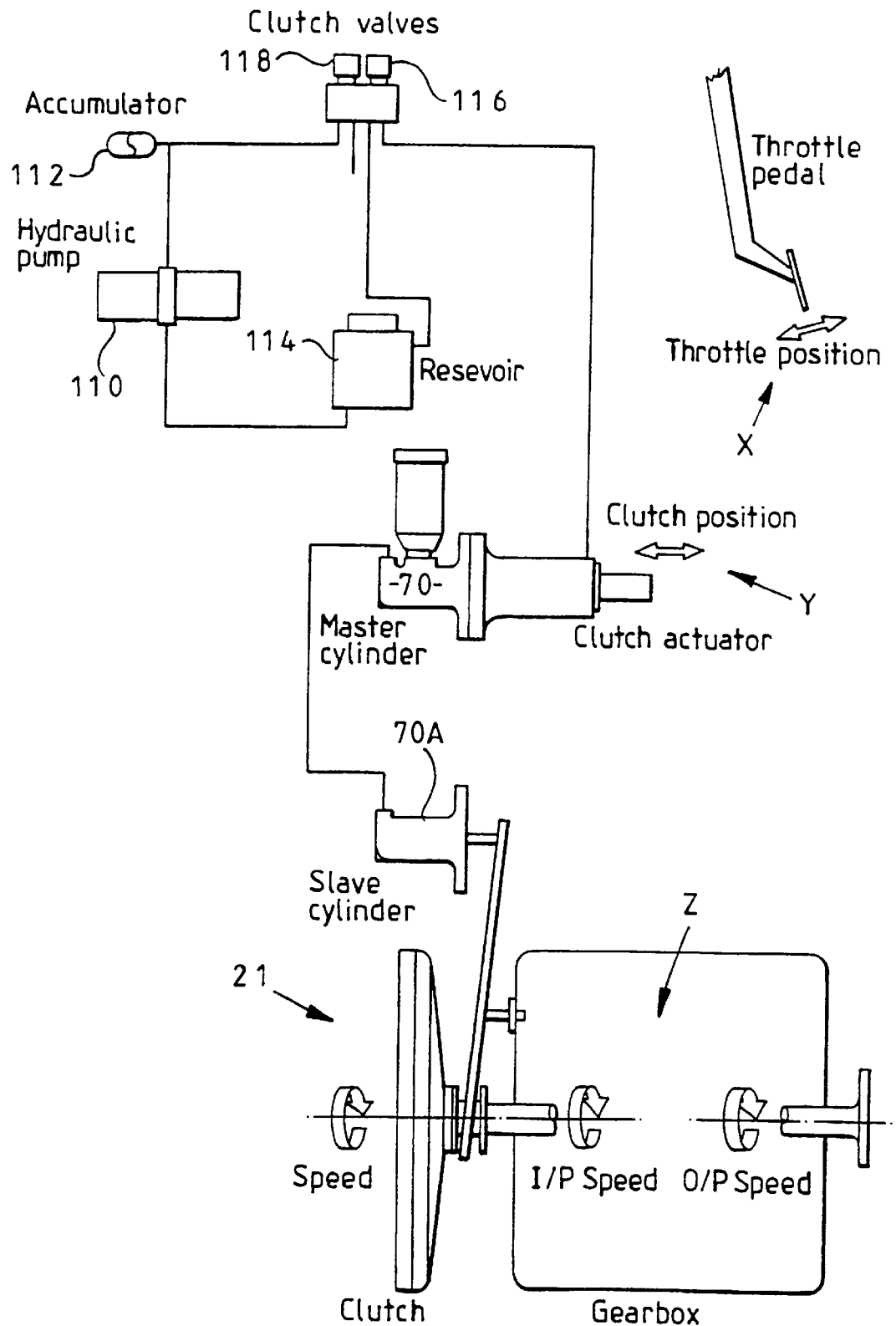
Figure 5:
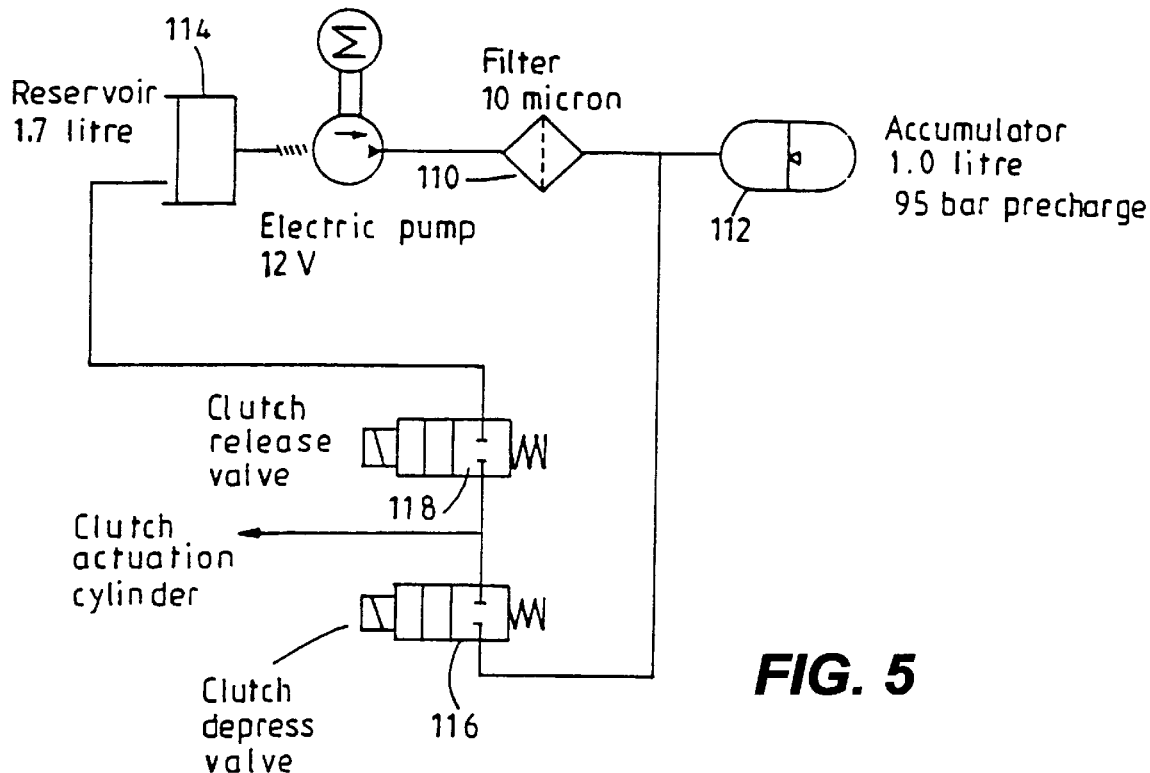
Figure 6:
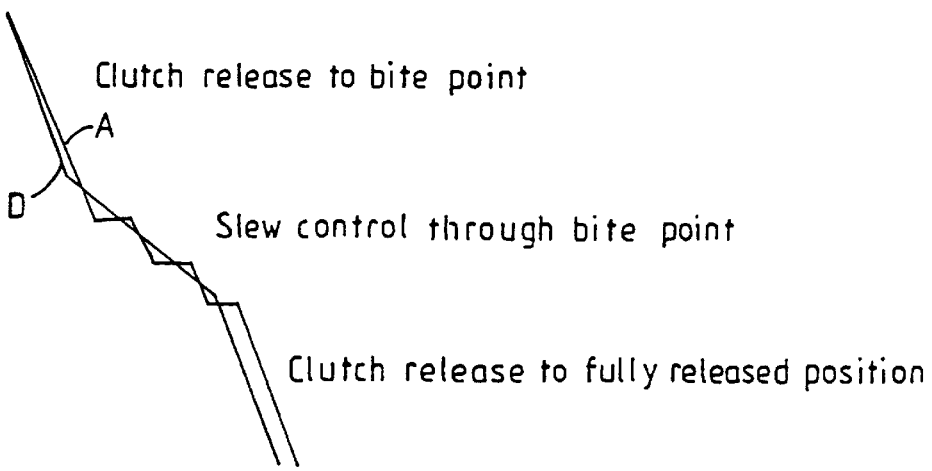
Figure 7:
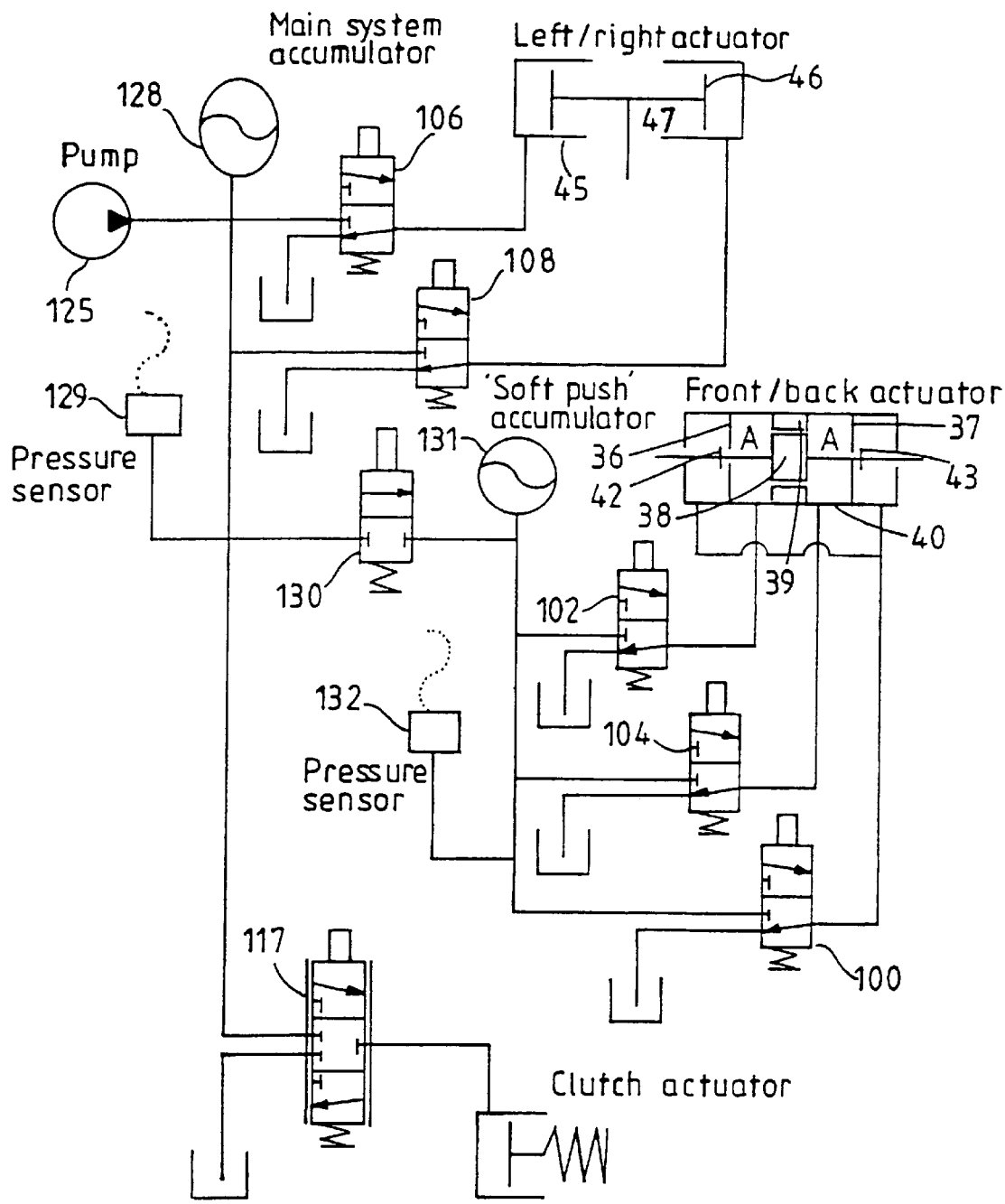

There will now be described details of the invention given by way of example only and with reference to the following drawings, in which:

FIG. 1 is a plan view of a vehicle fitted with the gear change mechanism of the invention, FIG. 2 is a longitudinal section through a gearbox drive assembly or actuator, FIG. 3 is a section on the line 3—3 in FIG. 2, FIG. 4 is a schematic diagram of a clutch mechanism for use with the actuator of FIGS. 1–3, FIG. 5 is a hydraulic circuit diagram of the mechanism of FIG. 4, FIG. 6 is a diagram showing clutch release, FIG. 7 is a hydraulic circuit diagram for the drive assembly of the gearbox, the clutch mechanism and a throttle control mechanism, and FIG. 8 is a chart showing the sequence of controls for use during a gear change operation.

Referring to the drawings and firstly to FIGS. 1, 2 and 3 there is shown a vehicle having an automatic gearbox driven by a drive assembly which is similar to that described in our prior, patent application published under number WO 95/02775. Accordingly an abbreviated description is given whereby to relate the modified drive assembly or actuator and the associated clutch and throttle control mechanisms to the original disclosure.

A significant difference between the apparatus described in said prior application and that of the present application is that hydraulically operated drives are used for the apparatus of the present invention instead of pneumatically operated drives.

For the most part the change from pneumatic to hydraulic drive does not affect the basic construction of the actuator 20 of FIGS. 1, 2 and 3. Instead of pneumatic valves and pneumatically operated cylinders, hydraulic valves and cylinders are employed. Such valves and cylinders are controlled and supplied with hydraulic fluid in a modified arrangement.

In FIG. 1 is shown an automobile 10 having an engine 11, clutch 12, gearbox 13 and steering wheel 14. An electronic control unit 17 for the gear change mechanism is fitted to the vehicle which is in addition to the vehicle's own electronic control unit 18.

A gearbox actuator 20 is associated with the gearbox 13 and is supplied with pressure fluid through hydraulic valves 21 from an electric pump 15 and a fluid reservoir 16. A throttle control mechanism 22 is powered through hydraulic valves 23 from the pump 15. A clutch control mechanism 24 is associated with the clutch 12 and is powered through valves 25 from the pump 15.

The steering wheel 14 carries actuating switches 19A and 19B operatively connected to the electronic control unit 17 and there are provided further sensors connected to the control unit 17 for inter alia detecting:

input shaft speed to the gearbox 13
road speed of the vehicle
clutch position
hydraulic pressure from the pump 15
the position taken up by the actuator 20 for the gearbox 13
engine speed sensor Further details of how this information is monitored and used in the control unit 17 will become apparent.

The vehicle is fitted with the usual throttle control (accelerator pedal), gear operating lever (not shown) and clutch control (not shown) which can be operated in conventional manner. Alternatively the gear operating lever and the manual clutch may be omitted.

Actuation of a gear change is effected by the vehicle driver from switches mounted on the vehicle steering wheel 14. There is a set of switches 19A on one side of the steering wheel facing the driver and another set 19B of switches on the other side of the steering wheel. One set of switches is for changing gears up and the other set is for changing down.

The sets of switches 19A and 19B are associated with a transmitter 19C so that upon operation of a switch 19A or 19B a signal is transmitted which is received by a receiver 19D mounted on a fixed part of the vehicle, for example on the vehicle fascia. The transmitter/receiver arrangement 19C and 19D utilises infra-red medium but the arrangement may use radio signals.

The actuator 20 for the gearbox 13 is shown in detail in FIGS. 2 and 3 and is powered hydraulically through a five valve arrangement 21, there being an outer housing 30 providing ports (not shown) for the introduction and discharge of hydraulic fluid. Within the housing 30 is located a central shaft 31 which is connected at one end to the gearbox 13 for operation of the gearbox. The shaft 31 connects with a gearbox input lever 33 of conventional form and, for illustration purposes there is shown a typical gearbox layout 35 which the mechanism 20 operates. In the illustrated version there is shown a six speed gearbox having five forward gears and a reverse gear with the layout being of standard H pattern.

The shaft 31 is moveable in its axial direction and is also rotatable about its axis. There are drive means to effect operation of the various axial and rotational movements. Thus the drive means for the axial movements includes a pair of pistons 36 and 37 located to opposite sides of a portion 38 of the shaft 31 which is of enlarged diameter, the pistons 36, 37 having a limited axial movement relative to the shaft 31. Located around the enlarged portion 38 of the shaft 31 is a sleeve 39 which is fixed in relation to the shaft housing 30 but the shaft 31 is slidable relative to the sleeve 39.

To accommodate the pistons 36 and 37 and the sleeve 39 the housing 30 is formed with a cylindrical chamber 40, and at opposites ends of the chamber 40 are formed annular recesses 41 in which are locatable collars 42 and 43 axially fixed on the shaft 31.

Inlet and outlet ports (not shown) for hydraulic fluid are provided in the casing to admit and discharge fluid to move pistons 36, 37 and collars 42, 43 along the chamber and hence move the shaft 31 in the axial direction. Fluid supplied to the ports is from the set of hydraulic valves 21.

In FIG. 2 the shaft 31 is in its central, neutral position in which none of the gears are selected. In this position the chambers A to the sides of the pistons 36, 37 are fed with fluid from a valve 100 (FIG. 7) of the set of valves 21, hereinafter referred to as the neutral valve 100, so that the fluid pressures are equal and the actuator is urged to its neutral position. In this position each piston 36, 37 is engaged with a shoulder of the enlarged portion 38 of the shaft 31 and with opposite sides of the sleeve 39.

To move the shaft 31 from the neutral position fluid is introduced into one of the chambers A which lie between the associated piston 36 or 37 and the side of the sleeve 39 adjacent this piston. This causes the piston 36 or 37 to move outwards away from the sleeve 39 and into engagement with the associated collar 42 or 43, causing the shaft 31 and the collar 42 or 43 to move to the left or to the right until the piston 36 or 27 is at an extreme end of the chamber 40 and the collar 42 or 43 is located in its associated recess 41. This action causes the pistons 36 and 37 to drive the shaft 31 to either one of its axial end positions in which the piston or the piston 37 is at the end of the chamber 40.

Valves 102 and 104 (FIG. 7) are provided for moving the pistons 36 and 37 respectively to drive the shaft 31 to either one of its axial end positions and are termed the front and back valves respectively. Operation of the valves 100, 102 and 104 will be described with reference to FIG. 7.

For a rotational movement of the shaft 31 a separate drive arrangement is provided. This includes a housing 45 for a piston 46 whose axis extends at a right angle to the axis of the shaft 31 and is spaced therefrom. The housing 45 defines a chamber 47 in which the piston 46 is moveable and hydraulic fluid is introduced into the chamber through ports (not shown) and from valves 106 and 108 (FIG. 7) of the set of valves 21. At a centre portion of the piston 46 there is formed a peripheral groove or channel 48 in which is located a finger 49, coupled to the shaft 31. The valves 106 and 108 are operated to rotate the shaft 31 in one direction or the other about its axis and are termed the right valve 106 and the left valve 108. When the piston 46 is in its central position gears 3 and 4 may be selected. When the piston 46 is in its left hand position two other gears (1 and 2) may be selected, and in the right hand position the final two gears (5 and reverse) may be selected.

Thus movement of the piston 46 moves the gear lever along the neutral path whereas an axial movement of the shaft 31 moves the gear lever from neutral into the various gears.

Referring now to FIG. 3 there is provided biasing means for biasing the shaft 31 towards the centre of the gate of the gearbox. In the present case the biasing arrangement comprises helical springs 90A and 90B having their line of action extending at a right angle to an arm 50 connected to the shaft 31, the springs 90A and 90B being located in respective pistons 51 and 52 at their ends, the pistons engaging at opposite sides of the arm 50. The opposite ends of the springs 90A and 90B are engaged with housing members 92A and 92B respectively. The equal and opposite action of the springs 90A and 90B on the arm 50 bias the arm 50 and hence the shaft 31 towards the centre of the gate of the gearbox and the arm 50 is moveable axially of the pistons 51, 52 accordingly to the axial position of the shaft 31.

A sensor 58 is provided for sensing the axial position of the shaft and a further sensor (not shown) senses the rotational position of the shaft 31.

Referring now to FIGS. 4 and 5 in which is shown a clutch control mechanism whereby the clutch is automatically operated upon actuation of the gear change mechanism, a conventional master cylinder 70 is utilised with an associated slave cylinder 70A which operate a clutch 21 of generally conventional form. An actuating cylinder (not shown) supplied with hydraulic fluid from a hydraulic pump 110 in communication with an accumulator 112, a reservoir 114, and clutch valves 116 and 118 (FIG. 5) operates the master cylinder 70 and slave cylinder 70A.

The clutch valve 116 is termed the clutch depress valve and is operated to effect depression of the clutch 21 to disengage drive at the initiation of a gear change or when the vehicle is stationary. The clutch release valve 118 is operated to effect release of the clutch 21 to engage drive after a gear change has been effected or when driving away from rest. As shown in the drawings the clutch 21 is intended to be wholly automatically operated, that is, there is no manually operated clutch pedal facility. However the arrangement can be adapted for operation manually in addition to automatically, if required.

In FIG. 4 there is indicated sensors by which the clutch is operated automatically, such sensors identifying throttle position, as indicated at X, clutch position, as indicated at Y, and the engine speed and gearbox input and output speeds as indicated at Z.

In order to obtain a smooth take-up of drive the torque transfer capacity of the clutch is controlled by the electronic control unit 17. In the preferred embodiment, a conventional dry-plate clutch is used with a lever to control clutch clamping load, and the torque transfer characteristic of the clutch is primarily a function of the displacement of the lever which gives rise to axial relative displacement between the clutch plates. When the clutch is to be released the clutch release valve 118 is opened and the clutch is allowed to release rapidly to a predetermined position in its movement which is closely approaching the bite point of the clutch, the operation of the valve 118 being controlled by the electronic control unit. Thereafter the clutch torque transfer capacity is adjusted by closed loop control of displacement of the clutch plates and/or the rate of displacement of the clutch plates. Referring to FIG. 6, line A shows the actual clutch position during release and line D shows the ideal clutch position during release. The objective is to bring line A closely adjacent line D. The hydraulic valve control means can either take the form of a proportional flow control valve or a solenoid valve using pulse width modulation to vary flow rates. Successive opening and closing of the valve 118 achieves a suitable matching of the line A to line D. Once the clutch has moved fully through the bite point the valve 118 is moved rapidly to the fully released position. In other embodiments the control means to control the clutch transfer capacity may be electrically or pneumatically operated.

In other arrangements a hydraulic piston can vary the clamping load on the clutch and the torque transfer characteristic is then dependent on hydraulic pressure. In this arrangement the pressure and/or the rate of change of pressure are controlled to take up drive through the clutch.

At different relative speeds between the engine speed and the gearbox output speed and at different gear changes the desired clutch position and movement will alter. Information concerning the relevant clutch movement for each situation may be stored in the electronic control unit 17 so that a comparison between the actual clutch movement and the pre-programmed desired clutch movement can be made to achieve the most satisfactory clutch movement during engagement of the clutch. Further features of the clutch operation will become apparent from a consideration of the full gear change operation later.

The gear change mechanism also provides a throttle control unit (not shown) associated with the accelerator pedal which may be in a similar form to that of FIGS. 7–9 of said prior application WO 95/02775 except that hydraulically operated cylinders are used. Thus the throttle control unit is capable of causing the throttle to move to a zero setting irrespective of the position of the accelerator pedal. In addition the throttle control arrangement is provided with means whereby the throttle may be temporarily opened during a gear change operation. This is primarily to increase engine speed during a change down gear change to enable the speed of the engine to be matched with a gear speed. The operation of the throttle control unit in this way may be achieved through hydraulic cylinders or electronically, to bring about the temporary throttle increase or 'blip' or to close the throttle—'flip'. The throttle control unit is operated according to instructions from the electronic control unit 17, as will be described.

Referring now to FIG. 7 there is shown an arrangement whereby the actuator valves 100, 102, 104, 106 and 108 of the neutral cylinder, back and front cylinders, and right and left cylinders, respectively, are controlled. Hydraulic fluid is supplied from a pump 125 with a hydraulic accumulator 128 and a pressure sensor 129. This arrangement provides a main line pressure which may be set at a level of say 40–70 bar and this main line supply is provided directly to the right and left cylinders through right and left valves 106 and 108.

A subsidiary circuit supplies pressure fluid to the neutral valve 100 and to the back and front valves 102 and 104 through a supply valve 130, a hydraulic accumulator 131 and a pressure sensor 132. The object of this subsidiary controlled supply is to enable relatively low pressure fluid and high pressure fluid to be supplied to the neutral cylinder and the back and front cylinders, when required. This enables the gear engagement through the actuator 20 to be achieved in two movements, an early part of the movement giving a "soft push" facility at low pressure so that the force applied by the actuator 20 is reduced. This first movement is succeeded by a further movement at higher pressure to complete gear engagement. To achieve the soft push movement, at initiation of operation of one of the valves 100, 102 and 104 the electronic control unit 17 monitors the pressure in the circuit through the pressure sensor 132 with the supply valve 130 closed. Normally the pressure, when valve 130 is closed, will be below normal line pressure and at say 20 bar because of pressure decay in the circuit due to leakage and other causes. However even if line pressure is relatively high in the subsidiary circuit the initial movement of the actuator towards gear engagement will reduce the line pressure when the valve 130 is closed. As the actuator moves with a relatively low force the pressure sensor 132 continues to monitor the line pressure and, if necessary, the supply valve 130 is opened to admit further fluid until a predetermined pressure is reached. As the actuator 20 is moved towards gear engagement the control unit 17 can select the open condition for the supply valve 130 so that full line pressure to the respective cylinder is provided to complete the gear change. By this means the control arrangement enables the selected valves 100, 102 and 104 to be operated at relatively low pressure to operate the respective cylinders at lower engagement force over that period of gear engagement where excessive force may cause damage or the speed of operation may interfere with the operation of synchromesh in the gearbox. Supply of pressure fluid to the valves 106 and 108 is not subject to the same soft push facility since these valves control movement of the gear lever through the neutral position.

Instead of providing a hydraulic accumulator other compliant means providing a reservoir of fluid pressure may be used.

It will be seen that by sensing the line pressure, using sensor 132, feeding the value to the control unit 17 and controlling the operation of the valve 130, any suitable pressure may be provided to the valves 100, 102 and 104 between zero pressure and the full pressure of the hydraulic supply. The pressure of the supply will be arranged by the programming of the control unit to give the desired force by the actuator having regard to the input and output speeds of the gearbox. The pressure in the supply will be arranged by the programming of the control unit 17 to give the desired force by the actuator 20 by having regard to the input and output speeds of the gearbox and other vehicle parameters. For example a low gearbox oil temperature may require a higher supply pressure.

It would also be possible to control the pressure to the valves 100, 102 and 104 and associated cylinders by having a pressure regulator in the circuit whereby the pressure in the circuit is reduced to a predetermined level compared with the supply pressure. However this is not normally found to be necessary in practice as the pressure in the circuit reduces to a suitable level between gear changes.

FIG. 7 also shows an arrangement in which a clutch valve 117, which is a single, four port proportional flow valve, (replacing the valves 116 and 118 of FIG. 5) is supplied from a common source of hydraulic fluid 125.

Referring now to FIG. 8 there is described a full gear change sequence utilising the actuator 20 and associated clutch control and throttle control arrangements. By monitoring various parameters of the engine, gearbox, clutch, throttle and hydraulic pressures, together with pre-programmed control criteria in the electronic control unit 17 a change gear operation can be effected by the driver automatically simply by initiating a gear change using the switches 19A and 19B on the steering wheel.

A change gear sequence is identified in FIG. 8 starting at the top with the actuation of a change gear operation by the driver. This is checked by the control unit to establish whether the instruction can be safely carried out. If not a warning is sounded.

A check is also made to ensure that the engine speed is less than the input speed and the throttle is operated to reduce the throttle setting. The clutch is then fully depressed and a check on throttle position is made. When the throttle position is half way the throttle position is reduced to idle and the neutral valve 100 is operated at the reduced line pressure, as described. A check is then made that the gear is in neutral whereupon the left or right valve 108 or 106 is operated as appropriate. A check is then made to ensure that the movement is achieved. The control unit also ensures that the clutch is fully disengaged.

At this point the throttle setting can be temporarily increased to provide a throttle blip. A check is made that the input and output speeds are synchronised, the back valve 102 or the front valve 104 being operated at soft push pressure to initiate movement towards the gear engaged position. Towards the end of the movement into the gear engaged position the supply valve 130 is opened to achieve a higher gear engagement force.

A check is made that the full movement of the gear actuator 20 has been achieved. A check is also made that the ratio of the input and output speeds is in the allowable range, if not the appropriate valve is operated to move the actuator towards the neutral position and a retry strategy is then used to select and appropriate gear. If all is in order the supply valve 130 is closed and clutch operation commences.

Continuing the gear change sequence the clutch depress valve 116 or 117 is closed and the clutch release valve 118 or 117 is opened. Operation of the release valve 118 is controlled to achieve movement through the bite position, whereafter the valve 118 is open to fully engage the clutch. The operation of the clutch is timed so that upon full release of the clutch a flip valve or electronic control is operated to disengage the flip function. The throttle is then again under the control of the driver and the clutch is fully released. Only upon completion of all these steps will the gear change cycle be completed and a further gear change request will be actioned.

It will be appreciated that the clutch operation described may be employed in other kinds of gearbox including manually operated gearboxes. In such an arrangement the gearbox will includes switches whereby upon initiating a gear change the clutch control arrangement will be actuated to cause the clutch to disengage and re-engage automatically according to pre-programming of the clutch control unit. Such an arrangement can also include sensors to monitor that the gear change selected is in accordance with safe parameters, for example a selection to move the gear from the highest gear to the lowest gear or to reverse can be over-ruled by the control.

By the use of the described arrangement the driver selects when a gear change is to be made but without the driver having to use the clutch, throttle or gear lever of the vehicle. The driver simply selects whether a gear change is to be made which is an up or a down gear change upon which the selected change is effected. By monitoring the various parameters of the gear change the control unit can effect a smooth change which may even be such as to be able to omit the syncromesh facility of the gearbox. In comparison with conventional automatic gearboxes the mechanisms are relatively simple and avoid losses which are normally incurred in torque converters and similar mechanisms of automatic gearboxes.

The gear change arrangement described can be fitted to vehicles fitted with conventional gearboxes, engine power output control means (such as a throttle), and clutches and, as described, the normal manual clutch control can be omitted. As a further alternative the gear change arrangement may be made fully automatic by programming the control unit to select the appropriate gear to match engine and road speed having regard to throttle settings. Gear changes would then be initiated according to such programming.

Instead of the arrangement shown described for controlling the force supplied by the actuator during a gear change a flow control solenoid may be provided to control the fluid pressure applied to the actuator in effecting gear engagement. Such solenoid would operate to bring about the same result as is described, ie a lower pressure gear engagement movement, or 'soft push' and a higher pressure movement after engagement. Moreover the position at which the pressure changes from 'soft push' is determined by a calculation of the control unit 17 which compares the ratio of input and output speeds with the selected mechanical ratio.

Where in the description 'throttle' is referred to, this term should be understood to include any means by which the output torque or power from the engine is altered. In internal combustion engines this may be by limiting the fuel supply or air flow to the engine but other controls can be used such as by retarding the spark timing to reduce torque. With compression ignition engines the engine torque may be controlled by controlling fuel injected, for example by controlling the pulse width of the fuel injector.

It is also preferred that the control unit 17 is programmed to calculate if a selected gear change is within acceptable limits so that the engine is not overstressed, for example by being over-revved on downshifts or by having too low an engine speed on upshifts.

We claim:

1. A vehicle gear change mechanism comprising:

a prime mover or engine, a change speed gear box, clutch means through which drive is transmitted from the prime mover to the gearbox, a gearbox actuator for effecting a change of gear ratio in the gearbox, the actuator being pressure fluid operated, control means for controlling the operation of the actuator in accordance with a selected change of gear ratio, and a fluid supply for supplying pressurized fluid to the actuator at a first pressure, the fluid supply including:

isolating means disposed between the fluid supply and the actuator, and valve means disposed between the isolating means and the actuator;

wherein the control means is arranged so that during a first part of the movement of the actuator the isolating means is operated to interrupt the supply of pressurized fluid from the fluid supply to the actuator and the valve means is operated to supply residual fluid, downstream of the isolating means, to the actuator at a second pressure;

and wherein during a second part of the movement of the actuator the isolating means is operated so that pressurized fluid from the fluid supply communicates with the actuator and the valve means is operated to supply said fluid to the actuator at said first pressure, the operation of the actuator being such that over the first part of the movement of the actuator the force applied to the actuator to effect a gear change is less than over the second part of the movement of the actuator.

2. A mechanism according to claim 1 wherein the change speed gearbox incorporates synchromesh and the reduced force applied by the actuator is over that part of the gear engagement during which the synchromesh is operative.

3. A mechanism according to claim 1 wherein the actuator is hydraulically operated and the control means controls the operation of the actuator according to the hydraulic pressure applied to the actuator, whereby the hydraulic pressure applied to the actuator, and hence to operate a gear change, is reduced during gear engagement, the position of the actuator being monitored by the control means.

4. A mechanism according to claim 1 wherein the fluid supply includes a pressure regulator to selectively reduce the hydraulic pressure downstream of the regulator which is applied to the actuator.

5. A mechanism according to claim 1 wherein the clutch means is hydraulically operated and the control means effects operation of the clutch means during a gear change selection, the clutch means being hydraulically powered towards a clutch disengaged position and being biased towards an engaged position, movement towards an engaged position being controlled by the control means through a pressure release valve.

6. A mechanism according to claim 5 wherein the pressure release valve for the clutch means is controlled by the control means to effect clutch movement in two phases and a rapid movement before clutch engagement, and a slow movement through the clutch bite region.

7. A mechanism according to claim 1 comprising throttle means for the prime mover, the control means being arranged to control the setting of the throttle means during a gear change to match the speed of the prime mover according to the selected gear change.

8. A mechanism according to claim 7 wherein the control means controls the setting of a linkage between a manually operable throttle control and the prime mover.

9. A mechanism according to claim 7 wherein the control means controls the setting of an electrically actuated prime mover control parameter.

10. A mechanism according to claim 1 wherein the force applied by the actuator during a gear change is controlled having regard to the selected gear change.

11. A mechanism according to claim 1 wherein the isolating means comprises a control valve, and the fluid supply further comprises a fluid accumulator or other compliant means disposed between the control valve and the valve means whereby on interrupting the supply of fluid by operation of the control valve said second pressure is available from the accumulator.

12. A mechanism according to claim 11 wherein the control means further comprises sensor means disposed downstream of the control valve for sensing the pressure of the fluid supplied to the actuator wherein if the pressure of the fluid falls below a predetermined level, the control valve operates to connect the fluid supply to the actuator to increase the pressure of the fluid above said predetermined level.

13. A mechanism according to claim 12 wherein the control valve is opened and closed with reference to the pressure sensed by the sensor means, the position of the actuator, and in accordance with the control means.

* * * * *